United States Patent [19]

Toth, Jr.

[11] 4,308,083

[45] Dec. 29, 1981

[54] PNEUMATIC TIRE AND METHOD OF BUILDING A PNEUMATIC TIRE

[75] Inventor: Robert L. Toth, Jr., Cuyahoga Falls, Ohio

[73] Assignee: The Goodyear Tire & Rubber Company, Akron, Ohio

[21] Appl. No.: 134,005

[22] Filed: Mar. 26, 1980

[51] Int. Cl.³ .................. B29H 17/36; B60C 11/00
[52] U.S. Cl. .................. 156/129; 152/209 R; 152/361 R; 156/123 R; 264/326; 428/163; 428/167
[58] Field of Search .............. 156/96, 126, 127, 128, 156/129, 123 R; 152/209 R, 361; 264/326; 428/156, 163, 167

[56] References Cited

U.S. PATENT DOCUMENTS

| | | | |
|---|---|---|---|
| 2,309,042 | 1/1943 | Boyle | 156/129 |
| 2,402,430 | 6/1946 | Mooney et al. | 156/129 |
| 3,974,018 | 8/1976 | Arimura et al. | 156/125 |
| 4,234,371 | 11/1980 | Christman | 156/96 |

*Primary Examiner*—John E. Kittle
*Attorney, Agent, or Firm*—Frank Pincelli

[57] ABSTRACT

The green tread strip is preshaped prior to its application to the green carcass body structure such that the minimum cross-sectional areas of the green tread strip align with the void areas of the green tread design.

10 Claims, 5 Drawing Figures

PNEUMATIC TIRE AND METHOD OF BUILDING A PNEUMATIC TIRE

The foregoing abstract is not to be taken as limiting the invention of this application, and in order to understand the full nature and extent of the technical disclosure of this application, reference must be made to the accompanying drawings in the following detailed description.

BACKGROUND OF THE INVENTION

This invention relates to a pneumatic tire, and more particularly to a preshaped green tread strip for use in belted tires and an improved method of making belted tires.

The manufacturing of a bias belted or radial belted tire generally comprises building a first carcass body ply structure on a cylindrical building drum. The carcass body ply generally comprises of an inner liner, a cord reinforcing ply structure and two bead cores one at each axial end thereof. The carcass body structure is then shaped into a torodial configuration similar to the overall configuration of the final cured tire, except slightly smaller. A belt reinforcing ply structure is placed about the circumference of the carcass body. A strip of uncured tread stock is then placed circumferentially about the belt structure. The tire is then placed into a mold where it is expanded, shaped and vulcanized into its final configuration. During this molding process the tread rubber flows into the void areas of the mold thereby forming the tread pattern on the tire.

A pneumatic tire is a complex, dynamic article of manufacture in which all the components interact to achieve an overall performanace. The tire designer selects each component so as to optimize the overall performance of the tire. The tread compound has a substantial effect upon the overall performance of the tire. The particular compound that is selected by the tire designer is determined upon the basis of both its good and adverse attributes. It has been found desirable to use tread compounds which have a high degree of stiffness for high performance characteristics. However, the use of high stiffness compounds in the prior art under conventional tire building methods has caused extreme nonuniformity of the belt reinforcing structure in the cured tire. Belt nonuniformity can in turn cause vibrational and durability problems which may result in poor performance and/or premature failure of the tire.

In accordance with applicant's invention, compounds having high stiffness may be used in the conventional tire building process without the nonuniformity problems experienced in the prior art.

SUMMARY OF THE INVENTION

The invention is directed to preventing nonuniformity in the belt reinforcing package of a pneumatic tire resulting from the building process of the tire. In accordance with the present invention, the green tread rubber stock prior to its application to the tire is preshaped so as to minimize unequal pressure distribution on the tire during the initial stages of vulcanization.

DETAILED DESCRIPTION OF THE INVENTION

Figure 1:
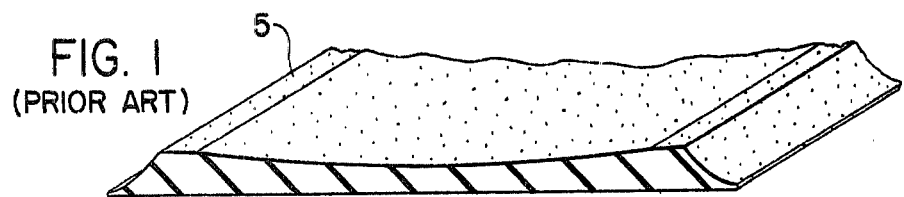
FIG. 1 is a perspective view of a portion of a green tread stock used in the prior art.
Figure 2:
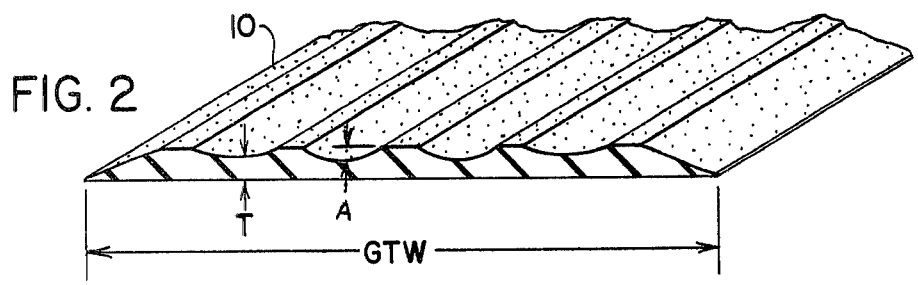
FIG. 2 is a perspective view of a portion of a green tread stock made in accordance with the present invention.
Figure 5:
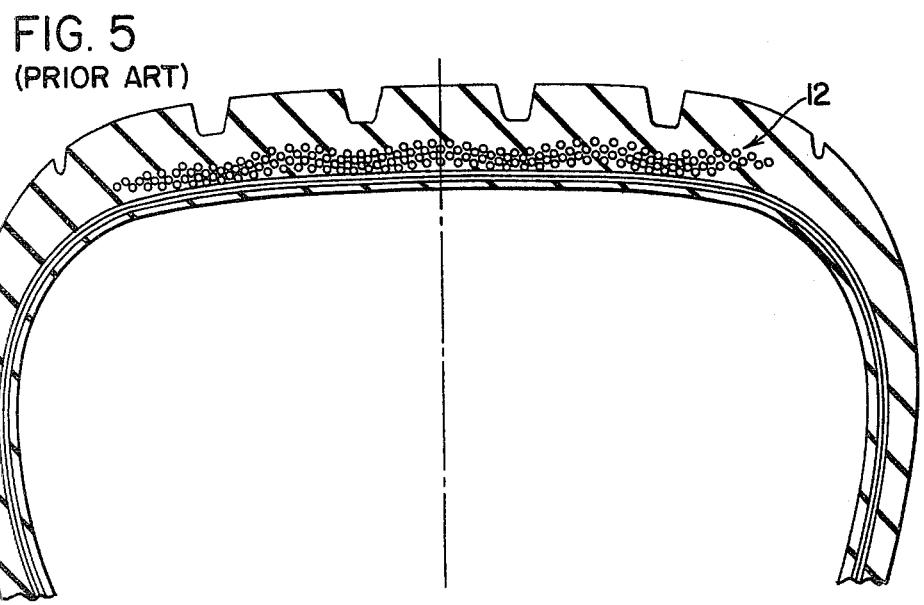
FIG. 5 is a partial cross-sectional view of a cured pneumatic tire using the green tread stock of FIG. 1.
Figure 4:
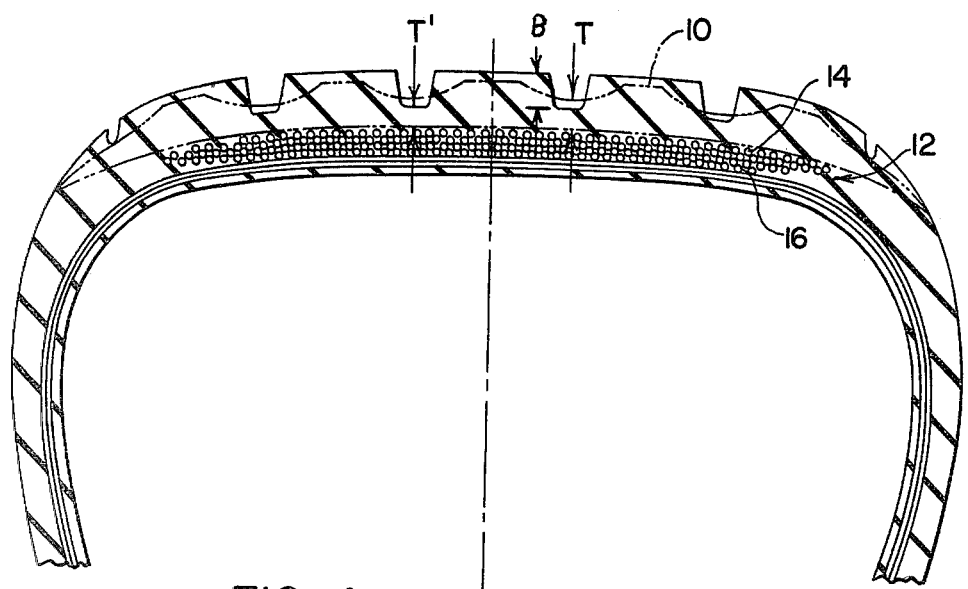
FIG. 4 is a cross-sectional view of a cured pneumatic tire taken along the line of 4—4 of FIG. 3 and illustrated in dash lines is a cross-sectional view of the green tread stock of FIG. 2 and illustrated in the axial relationship between the green tread stock and the cured tire.

Referring to FIG. 1 there is illustrated a portion of uncured tread stock, normally referred to as green tread rubber, used in the prior art. The thickness of the green tread stock 5 is substantially constant across its axial width. FIG. 2 illustrates an unvulcanized tread stock used in the manufacture of a tire in accordance with the present invention. The thickness of the green tread stock 10 varies substantially across the width GTW. The shape of the green tread stock 10 is determined in accordance with the final tread configuration of the tread portion of the tire. The thickness of the green tread stock 10 is greater in those areas in which there are substantial amounts of rubber in the cured tread design and is thinner in those portions of the green tread stock which align with the void areas of the cured tread design. It has been found that preshaping the green tread stock so that the rubber in the green state after being applied to the carcass body is relatively close to where it will be in the final cured state. This minimizes the amount of flow that must occur in the tread area of the tire and maintains a substantially constant pressure across the tread of the tire during the initial vulcanization of the tire. Bias belt and radial belted tires are generally built by the two stage building method. This generally comprises the building of a first carcass body ply structure on a cylindrical building drum. The carcass body ply generally comprises of an inner liner, a cord reinforcing ply structure and two bead cords one at each axial end thereof. The cords of the reinforcing ply structure of the particular embodiment illustrated in FIG. 4 is of the radial ply type construction, that is the cords form an angle from about 75° to 90° with respect to the midcircumferential plane of the tire, whereas bias ply tires have their cords form an angle less than about 75° with the midcircumferential centerplane of the tire. The carcass body structure is then shaped into a toroidal configuration similar to the overall configuration of a final cured tire, except slightly smaller. A belt reinforcing ply structure is placed about the circumference of the carcass body. In the particular embodiment illustrated, the belt reinforcing ply structure comprises of two folded substantially inextensible belt plies 14 and 16. The cords of plies 14 and 16 are generally made from a high modulus material such as aramid, steel or fiberglass. In the embodiment illustrated the cords of plies 14 and 16 are made of aramid. However, any desired belt configuration may be used. A strip of uncured tread stock is then placed circumferentially about the belt reinforcing ply structure. The tire is then placed into a mold where it is expanded, shaped and vulcanized into its final configuration. The mold may be of the two piece type or of the segmented type known in the prior art. In the initial time period after the mold is closed, a curing medium is introduced into the tire cavity at a relatively high pressure forcing the tire into the mold and causing the rubber to flow. However, during this initial phase, the green tread rubber has a relatively low temperature and is resistant to flow. After some elapsed time, the tread stock will heat up and flow very readily. However, during this initial phase, depending upon the physical characteristics of the tread stock being used, a substantially unequal pressure distribution of sufficient force can be developed across the width of the belt reinforcing structure 12 so as to cause the cords in the belt structure to deform such as is illustrated in FIG. 5. The stiffer the compound the more pronounced the nonuniformity of the belt reinforcing structure. Tread compounds having a mooney plasticity of at least 28 and generally greater than 30 experience this nonuniformity when tread stock of the prior art are used in the conventional building process. Preshaped tread stocks made in accordance with the present invention have been found to avoid this nonuniformity problem. In the particular embodiment illustrated the tread stock 10 has a mooney plasticity of about 33. For the purpose of this invention the mooney plasticity is determined in accordance with ASTM D1646 at 212° F.

Figure 3:
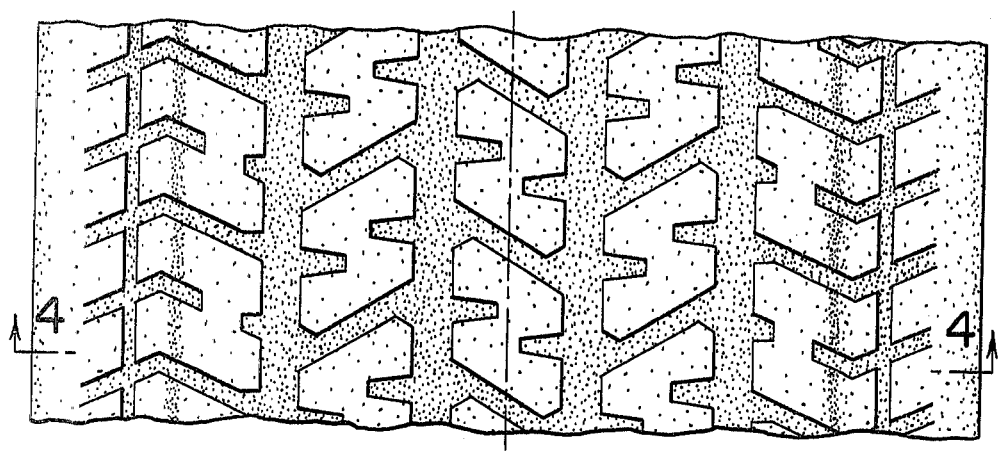
FIG. 3 is a top plan view of the tread portion of a tire made in accordance with the present invention.

The amount the green tread stock 10 is preshaped is dependent upon the final tread design of the cured tire. In the particular embodiment illustrated the cured tread portion comprises a plurality of independent projections placed in a plurality of rows forming continuous circumferentially extending grooves between the rows. The green tread stock 10 is shaped so that the majority of green rubber is placed in areas of the tire which axially align with ground engaging areas of the tread design of the cured tire and the areas of less green tread rubber align with the circumferentially extending grooves. This can be seen by referring to FIGS. 3 and 4 wherein a cured tread pattern of FIG. 3 is aligned in axial position with the green tread rubber shown in dash lines of FIG. 4. The radially outer surface of the green tread stock 10 has a substantially sinusoidal configuration wherein the peaks and valleys align with the projections and circumferential grooves of the cured tread pattern, respectively. The green tread stock 10 at the valleys of the tire configuration may range from about 5% to 200% greater than the thickness T' of the corresponding portions of the cured tread design, that is, the circumferentially extending groove area. Preferably, the thickness T may range from about 5% to 100% greater than the thickness T'. In the particular embodiment illustrated, the thickness T is about 100% greater than the thickness T'. The radially outer surface of the green tread stock is shaped such that the radial distance A between the peaks and valleys is equal or greater than about 20% of the nonskid depth B of the cured tread design and equal to or less than about 95% of the nonskid depth B (20% B$\lesssim$A$\lesssim$95% B). In the particular embodiment illustrated, the distance A is about 43% of the nonskid depth B. For the purposes of this invention the nonskid depth B is the radial distance from the bottom of the circumferential groove to the radial outer surface of the tread. Also, for the purpose of this invention the thickness T' of the cured tread stock is the radial distance from the radial outer surface of the radial outer belt layer to the radial outer surface of the bottom of the corresponding groove.

The present invention is particularly applicable to cured tread designs having continuous circumferentially extending grooves about the tire such as rib type tires and/or tire designs. The degree of preshaping of the green tread rubber becomes extremely difficult with complex tread designs. The green tread stock 10 of the present invention is simply extruded to the desired cross-sectional configuration necessary to supply the appropriate amount of rubber in the desired location. The green tread strip 10 should have sufficient amount of rubber therein so to fill completely the void area of the mold as is presently practiced in the prior art.

While the particular invention described is an advantage for green tread stock which has a high green stiffness, the present invention can also be applied to green tread rubbers having relatively soft compounds.

The present invention minimizes belt distortion caused by the pressure build-up beneath the projections in the tire mold which are associated with the void areas in the cured tread design. As the tire is being cured the pressure on the tire is greater beneath the projection of the mold which first contact the green tread stock. This initial contact restricts expansionof the tire in these areas. If a tread compound having a high stiffness is used, the tread compound will tend to cause the belt to distort in this area. Preshaping the green tread rubber minimizes the amount of flow that is required of the tread strips and additionally reduces the pressure buildup being exerted on the belt structure. Thus, the belt structure is allowed to retain its uniformity and structural integrity during vulcanization of the tire.

While certain representative embodiments and details have been shown for purposes of illustrating the invention, it will be apparent to those skilled in the art that various changes and modifications may be made therein without departing from the spirit or scope of the invention.

We claim:

1. A preshaped extruded unvulcanized tread strip for use in building a belted pneumatic tire wherein said unvulcanized tread strip is expanded and vulcanized in a mold, said tire having a plurality of continuous circumferentially extending grooves in the cured tread design, the radially outer surface of said unvulcanized tread strip having a substantially sinusoidal configuration such that when the tread strip is applied to the carcass body structure in the tire building process the peaks of said unvulcanized tread strip align with the ground engaging ribs or projections in a cured tread design and the valleys of said tread strip align with said circumferentially extending grooves of the cured tread design, said tread strip being made from material having a mooney plasticity of at least 28, the radial distance between said peaks and valleys of said radially outer surface of said unvulcanized tread strip is in the range from about 20% to 95% of the depth of the cured tread design, the radial thickness of the unvulcanized tread stock at the valleys is in a range from about 5% to 200% greater than the thickness of the corresponding portion of the cured tread design as measured radially outward from the radial outer surface of the radially outermost belt reinforcing ply.

2. A method of building a belted pneumatic tire having a plurality of continuous circumferentially extending grooves in the cured tread design comprising:

forming a carcass ply body structure on a cylindrical tire building drum;

expanding said carcass body structure to a first toroidal configuration;

applying a cord reinforcing belt structure about the circumference of said tire;

applying a preshaped extruded unvulcanized tread strip to the radially outer surface of said belt structure, said unvulcanized tread strip being made of material having a mooney plasticity of at least 28, the radially outer surface of said unvulcanized tread strip having a substantially sinusoidal configuration and being positioned on said tire such that the peaks of said unvulcanized tread stock align with the ground engaging projections or ribs of the cured tread design and the valleys align with the circumferentially extending grooves of the cured tread designs, expanding and vulcanizing said tire in a mold.

3. A method of building a pneumatic tire according to claim 2 further characterized by the radial distance between said peaks and valleys of said radially outer surface of said unvulcanized tread strip is in the range from about 20% to 95% of the depth of the cured tread design.

4. A method of building a pneumatic tire according to claim 2 further characterized by the radial thickness of the unvulcanized tread stock at the valleys is in a range from about 5% to 200% greater than the thickness of the corresponding portion of the cured tread design as measured radially outward from the radial outer surface of the radially outermost belt reinforcing ply.

5. A method of building a pneumatic tire having a plurality of continuous circumferentially extending grooves in the cured tread design comprising:
   forming a carcass ply body structure on a cylindrical tire building drum;
   expanding said carcass body structure to a first toroidal configuration;
   applying a cord reinforcing belt structure about the circumference of said tire;
   applying a preshaped unvulcanized tread strip to the radially outer surface of said belt structure, said unvulcanized tread strip being made from material having a mooney plasticity of at least 28 and having a cross-sectional configuration such that the pressure exerted across the width of said belt reinforcing structure during the initial phases of vulcanization in the mold is insufficient to cause any significant deformation in the belt structure of the cured tire; expanding and vulcanizing said tire in a mold.

6. A preshaped extruded unvulcanized tread strip for use in building a belted pneumatic tire wherein said unvulcanized tread strip is expanded and vulcanized in a mold, said tire having a plurality of continuous circumferentially extending grooves in the cured tread design, the radially outer surface of said unvulcanized tread strip having a substantially sinusoidal configuration such that when the tread strip is applied to the unvulcanized carcass body structure in the tire building process the peaks of said unvulcanized tread strip align with the ground engaging ribs or projections in the cured tread design and the valleys of said tread strip align with said circumferentially extending grooves of the cured tread design, said tread strip being made from a material having a mooney plasticity of at least 28, the radial distance between said peaks and valleys of said radially outer surface of said unvulcanized tread strip is in the range from about 20% to 95% of the depth of the cured tread design.

7. A preshaped extruded unvulcanized tread strip for use in building a belted pneumatic tire wherein said unvulcanized tread strip is expanded and vulcanized in a mold, said tire having a plurality of continuous circumferentially extending grooves in the cured tread design, the radially outer surface of said unvulcanized tread strip having a substantially sinusoidal configuration such that when the tread strip is applied to the unvulcanized carcass body structure in the tire building process the peaks of said unvulcanized tread strip align with the ground engaging ribs or projections in the cured tread design and the valleys of said tread strip align with said circumferentially extending grooves of the cured tread design, said tread strip being made from material having a mooney plasticity of at least 28, the distance between the peaks and valleys of the radially outer surface of said unvulcanized tread strip is about 43% of the depth of the cured tread design.

8. An unvulcanized tread strip according to claim 6 or 7 further characterized by the radial thickness of the unvulcanized tread stock at the valleys is in a range from about 5% to 200% greater than the thickness of the corresponding portion of the cured tread design as measured radially outward from the radial outer surface of the radially outermost belt reinforcing ply.

9. A preshaped unvulcanized tread strip according to claim 6 or 7 further characterized by the radial thickness of the unvulcanized trad stock at the valleys is about 100% greater than the thickness of the corresponding portion of the cured tread design as measured radially outward from the radial outer surface of the radially outermost belt reinforcing ply.

10. An unvulcanized tread strip according to claim 6 or 7 wherein said tread strip is made from a material having a mooney plasticity of approximately 33.

* * * * *

UNITED STATES PATENT AND TRADEMARK OFFICE
CERTIFICATE OF CORRECTION

PATENT NO. : 4,308,083
DATED : December 29, 1981
INVENTOR(S) : Robert L. Toth, Jr.

It is certified that error appears in the above-identified patent and that said Letters Patent are hereby corrected as shown below:

Claim 9, line 3, "trad" should read -- tread --.

Signed and Sealed this

Nineteenth Day of October 1982

[SEAL]

*Attest:*

GERALD J. MOSSINGHOFF

*Attesting Officer*    *Commissioner of Patents and Trademarks*